(12) United States Patent
Zhao et al.

(10) Patent No.: US 9,104,056 B2
(45) Date of Patent: Aug. 11, 2015

(54) COLOR FILTER SUBSTRATE FOR IN-CELL TOUCH PANEL AND MANUFACTURING METHOD THEREOF

(71) Applicant: Shanghai Tianma Micro-Electronics Co., Ltd., Shanghai (CN)

(72) Inventors: Lijun Zhao, Shanghai (CN); Jun Ma, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 49 days.

(21) Appl. No.: 14/105,771

(22) Filed: Dec. 13, 2013

(65) Prior Publication Data

US 2014/0168541 A1 Jun. 19, 2014

(51) Int. Cl.
*G02F 1/1335* (2006.01)
*G06F 3/041* (2006.01)
*G02F 1/1333* (2006.01)
*G06F 3/044* (2006.01)

(52) U.S. Cl.
CPC ...... *G02F 1/13338* (2013.01); *G02F 1/133514* (2013.01); *G02F 1/133516* (2013.01); *G06F 3/044* (2013.01); *G06F 3/0412* (2013.01)

(58) Field of Classification Search
CPC .................................................. G02F 1/133516
USPC ................................. 349/1, 21; 345/175–178
See application file for complete search history.

(56) References Cited

U.S. PATENT DOCUMENTS

2006/0256093 A1* 11/2006 Furukawa et al. ............ 345/173
2011/0057905 A1*  3/2011 Yu et al. ........................ 345/174
2012/0268396 A1* 10/2012 Kim et al. ..................... 345/173

FOREIGN PATENT DOCUMENTS

CN           101339314 A        1/2009

* cited by examiner

*Primary Examiner* — Paul Lee
(74) *Attorney, Agent, or Firm* — Kilpatrick Townsend & Stockton LLP

(57) ABSTRACT

An in-cell touch color filter substrate is disclosed. The color filter substrate includes a substrate including a plurality of display areas and a plurality of non-display areas, where each non-display area surrounds one of the display areas. The color filter substrate also includes a first metal layer, a first organic film layer, a second metal layer including a plurality of conductive pads provided in the non-display areas, and a second organic film layer, successively formed on the substrate. In addition, a plurality of through holes or through slots are formed on the first organic film layer in the non-display areas, where the conductive pads electrically connect with the first metal layer via the through holes or through slots, and where the conductive pads are exposed through the second organic film layer.

13 Claims, 9 Drawing Sheets

COLOR FILTER SUBSTRATE FOR IN-CELL TOUCH PANEL AND MANUFACTURING METHOD THEREOF

This application claims the benefit of priority to Chinese Patent Application No. 201210545726.4, filed with the Chinese Patent Office on Dec. 14, 2012, and entitled "COLOR FILTER SUBSTRATE FOR IN-CELL TOUCH PANEL AND MANUFACTURING METHOD THEREOF", the contents of which is incorporated herein by reference in their entirety.

TECHNICAL FIELD OF THE INVENTION

The present invention relates to plat panel displaying technologies, in particular to a color filter substrate for an in-cell touch panel and a manufacturing method thereof.

BACKGROUND OF THE INVENTION

A touch panel built in a liquid crystal display is integrated with a color filter substrate to effectively reduce the thicknesses of the entire touch display device and simplify the manufacturing process of the touch display device, and hence has been widely applied. In general, a touch can be monitored by detecting the capacitance of a mutual capacitor formed by two metal layers and one organic film layer which are integrated on the color filter substrate. Here, a touch detection signal is transmitted to the color filter substrate by a conductive pad through a gold ball bond on an array substrate.

Particularly, as shown in FIG. 1, an in-cell touch panel 100 in the prior art includes: an in-cell touch color filter substrate, an array substrate 102 that is adhered to the color filter substrate by a sealant 104, and a liquid crystal layer 103 disposed between the in-cell touch color filter substrate and the array substrate 102. The color filter substrate includes a substrate 105, as well as a black matrix 106, a first metal layer 107, a first organic film layer 108, a second metal layer 109, a color filter layer 110 and a second organic film layer 111 that are formed on the substrate 105 successively. The first metal layer 107 includes a plurality of upper conductive pads 112, a lower conductive pad 113 corresponding to the upper conductive pads 112 is formed on the array substrate, and a conductive sealant 114 is filled between the upper conductive pads 112 and the lower conductive pad 113. A gold ball bond 115, by which the array substrate 102 and the color filter substrate are electrically connected, are mixed in the conductive sealant 114.

In the prior art, a first through hole 116 is formed in the first organic film layer 108 at a position corresponding to the upper conductive pads 112. Likewise, a second through hole 117 is formed in the second organic film layer 111 at a position corresponding to the first through hole 116. The upper conductive pads 112 are connected with the lower conductive pad 113 by the gold ball bond 115 passing through the first through hole 116 and the second through hole 117. Generally, the thickness of each of the first organic film layer 108 and the second organic film layer 111 is about 2 μm, thus, the gold ball bond 115 contacts with the upper conductive pads 112 only after passing through the holes with a depth above 4 μm. In order to allow the gold ball bond 115 to enter the second through hole 117 precisely, the applied conductive sealant 114 must cover the upper conductive pads 112 precisely.

Compared with the overlying precision of the sealant 104, the overlying precision of the conductive sealant 114 shall be higher. In order to save production time, the sealant 104 and the conductive sealant 114 are applied in different speeds. Because of the higher applying precision of the conductive sealant 114, the conductive sealant 114 is applied separately from the conductive sealant 114 in a low speed. Therefore, a relatively long time is required for completing the applying.

SUMMARY OF THE INVENTION

One inventive aspect is an in-cell touch color filter substrate. The color filter substrate includes a substrate including a plurality of display areas and a plurality of non-display areas, where each non-display area surrounds one of the display areas. The color filter substrate also includes a first metal layer, a first organic film layer, a second metal layer including a plurality of conductive pads provided in the non-display areas, and a second organic film layer, successively formed on the substrate. In addition, a plurality of through holes or through slots are formed on the first organic film layer in the non-display areas, where the conductive pads electrically connect with the first metal layer via the through holes or through slots, and where the conductive pads are exposed through the second organic film layer.

Another inventive aspect is an in-cell touch panel including an in-cell color filter substrate, including a substrate including a plurality of display areas and a plurality of non-display areas, where each non-display area surrounds one of the display areas, and a first metal layer, a first organic film layer, a second metal layer including a plurality of conductive pads provided in the non-display areas, and a second organic film layer, successively formed on the substrate, where a plurality of through holes or through slots are formed on the first organic film layer in the non-display areas, where the conductive pads electrically connect with the first metal layer via the through holes or through slots, and where the conductive pads are exposed through the second organic film layer, an array substrate, and a liquid crystal layer disposed between the in-cell touch color filter substrate and the array substrate.

Another inventive aspect is a method of manufacturing an in-cell touch color filter substrate, the method including providing a substrate including at least one display area and at least one non-display area surrounding the at least one display area, forming a first metal layer on the substrate, forming a first organic film layer on the first metal layer, etching off a part of the first organic film layer to form at least one through hole or one through slot, forming, on the first organic film layer, a second metal layer including at least one conductive pad in the non-display area and electrically connected with the first metal layer through the through hole or through slot, forming a second organic film layer on the second metal layer, and etching off a part of the second organic film layer to uncover the conductive pad.

DESCRIPTION OF THE SPECIFIC EMBODIMENTS

The concept of the present invention lies in providing a through hole or through slot in a first organic film layer in a non-display area of the in-cell touch color filter substrate and connecting a first metal layer and a second metal layer by a conductive pad passing through the through hole or through slot. Therefore, in the area of the conductive pad, the first metal layer and the second metal layer are arranged one above the other and uncovered by the second organic film layer. When the sealant mixed with gold ball bonds is applied on the conductive pad area, the gold ball bonds contact the conductive pads directly. The gold ball bonds contact the second metal layer without passing through holes having level differences (i.e. steps). Even if the deviation of the positions of applying the sealant mixed with gold ball bonds would not cause the case in which the gold ball bonds are unable to enter the holes precisely and hence fail to contact the conductive pads, so that the precision requirements for applying the sealant is reduced, and it is possible to employ an applying method with a faster coating speed to promote the production efficiency.

In order for better understanding on objects, solutions, and advantages of the present invention, further detailed description will be given below in conjunction with accompanying drawings.

Figure 1:
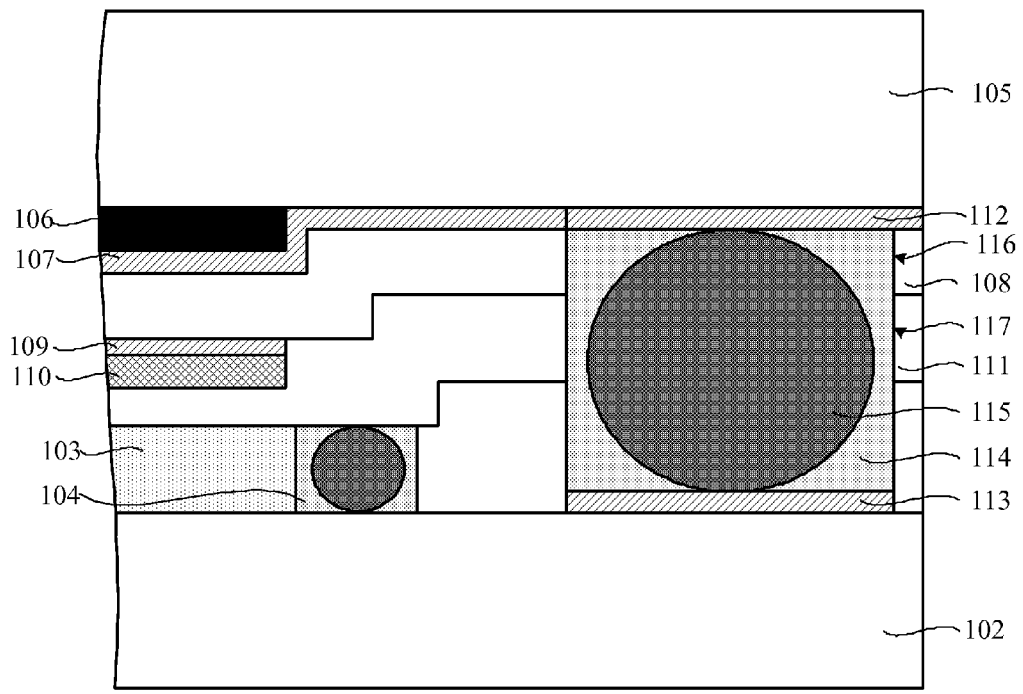
FIG. 1 is a schematic structural view of an in-cell touch panel in the prior art.
Figure 2:
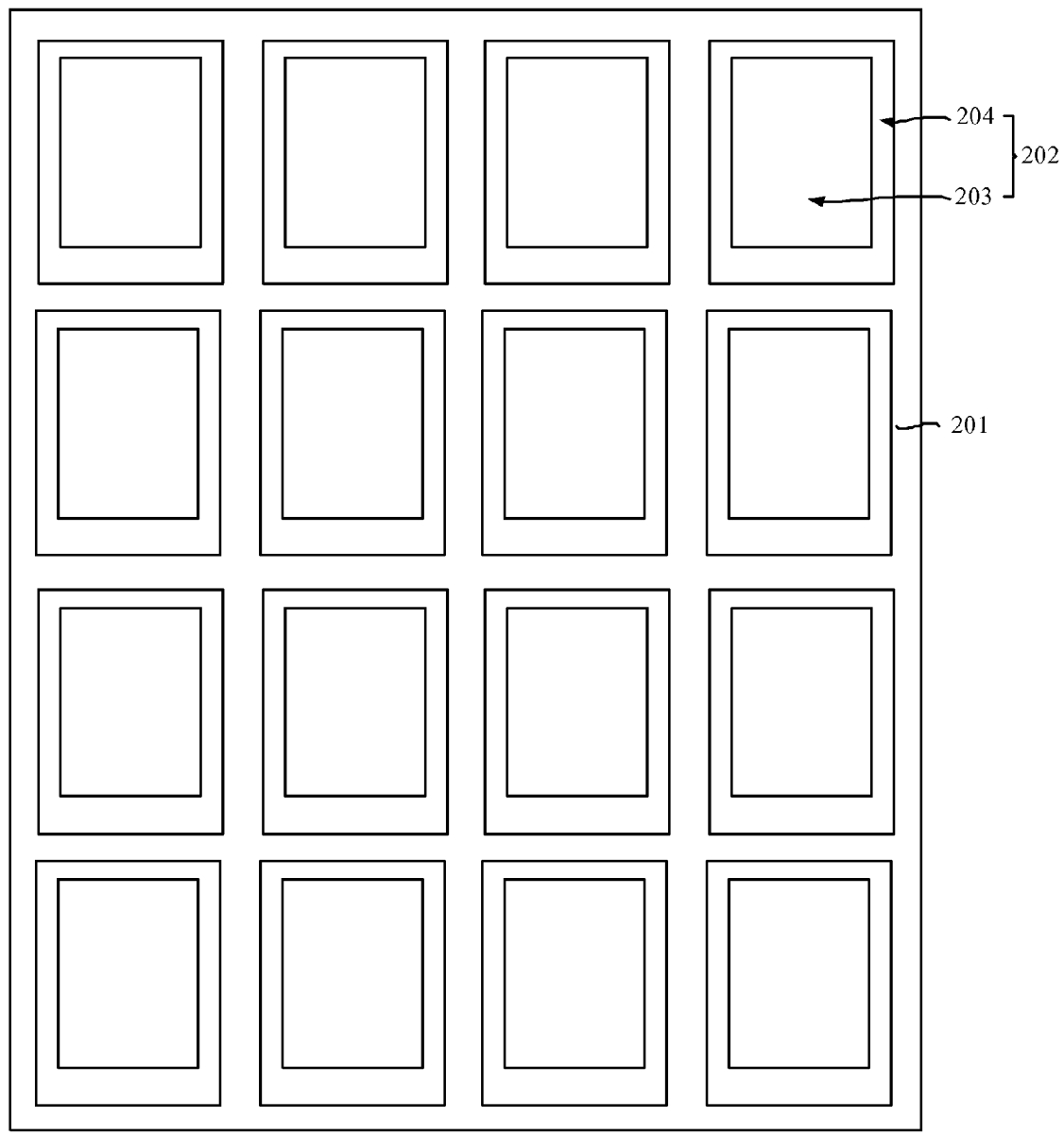
FIG. 2 is a top view of a substrate according to an embodiment of the present invention.

Firstly, as shown in FIG. 2, a substrate 201 is provided, and the substrate 201 includes a plurality of display units 202 each including a display area 203 and a plurality of non-display areas 204 surrounding the display area 203. Each display unit 202 corresponds to a subsequent in-cell touch display panel. For the sake of convenience, the following description is made for the case of one display unit, for example.

Figure 3:
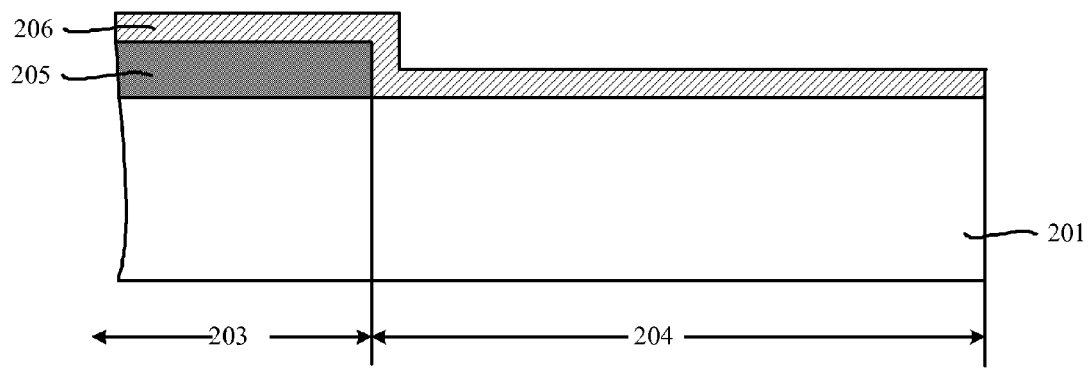
FIGS. 3 to 9 are schematic structural views of an in-cell touch color filter substrate in various steps of a method for manufacturing the in-cell touch color filter substrate according to an embodiment of the present invention.

As shown in FIG. 3, a black matrix 205 and a first metal layer 206 are formed on the substrate 201 successively, but the black matrix 205 is formed in the display area 203 merely. In the present invention, the first metal layer 206 functions as a driving electrode or a scanning electrode used for implementing a touch function, and the first metal layer 206 in the display area 203 has a grid-like structure formed above the black matrix 205.

Figure 4:
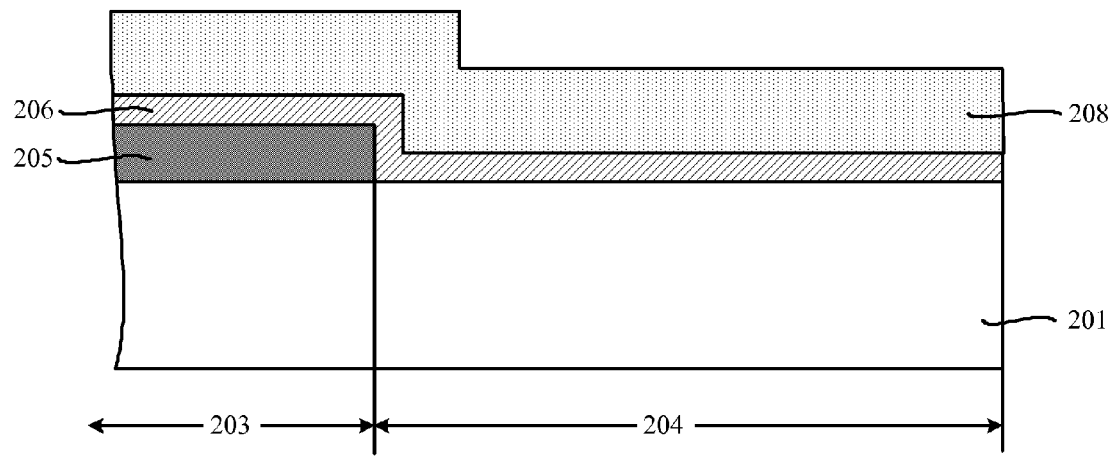

As shown in FIG. 4, a first organic film layer 208 covering all of the first metal layer 206, the black matrix 205 and other uncovered surface of the substrate 201 is formed on the first metal layer 206.

Figure 5:
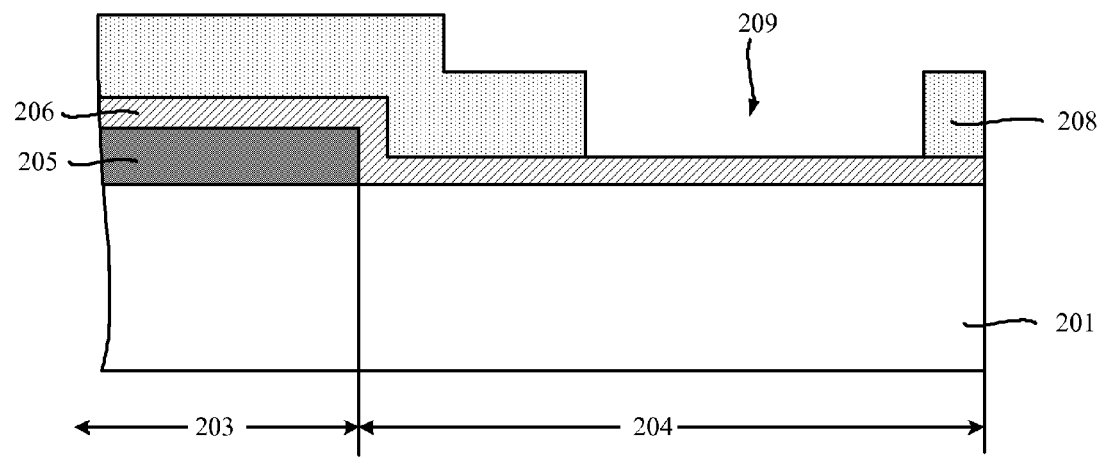

Subsequently, as shown in FIG. 5, a part of the first organic film layer 208 is etched off to form a plurality of through holes 209 (only one of which is shown) in the first organic film layer 208 in the non-display areas 204. The through holes 209 uncover the surface of the first metal layer 206. In order to sufficiently uncover the first metal layer 206, through slots having an enough large areas can be formed in the first organic film layer 208.

Figure 6:
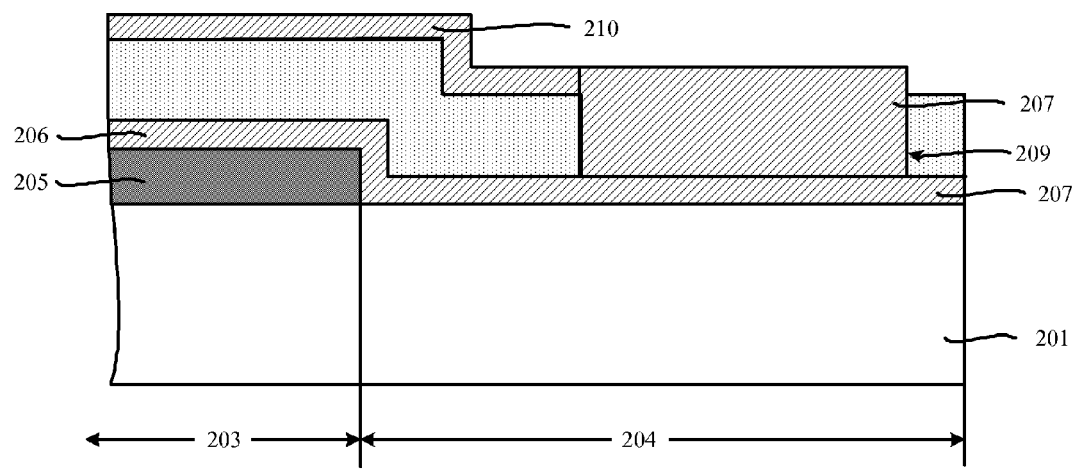

Subsequently, as shown in FIG. 6, a second metal layer 210 is formed on the first organic film layer 208, and the second metal layer 210 includes a plurality of conductive pads 207 (only one of which is shown) above each of the non-display areas 204 and contacting the surface of the first metal layer 206 through the through holes 209 so as to also connect with the first metal layer 206. In the present invention, the second metal layer 210 functions as the scanning electrode or driving electrode used for implementing the touch function, and the second metal layer 210 located in the display area 203 has a grid-like structure formed above the black matrix 205, and the positions of the second metal layer 210 and the first metal layer 206 deviate from each other in the display area 203.

Figure 7:
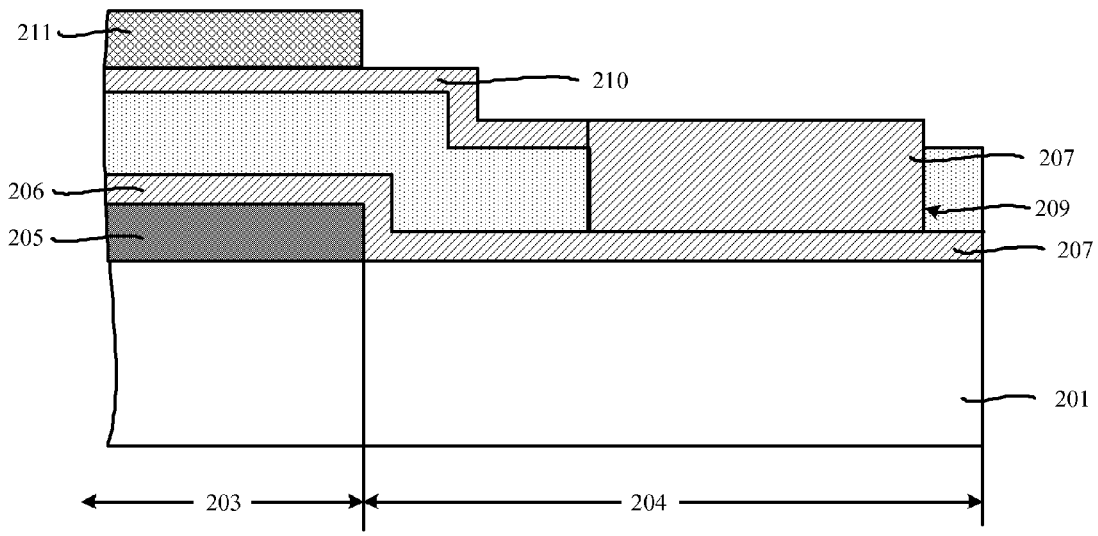

Subsequently, as shown in FIG. 7, a color filter layer 211 is formed on the second metal layer 210, and the color filter layer 211 is present in the display area 203 only, but not in the non-display area 204. The color filter layer 211, which includes a red color filter, a green color filter and a blue color filter, is formed at a position corresponding to an opening area of the black matrix 205. It should be noted that, the opening area of the black matrix 205 is not shown, instead, the black matrix 205 and its opening area are shown as a whole. However, the position relationship between the color filter layer 211 and the black matrix 205 is apparent for those skilled in the art.

Figure 8:
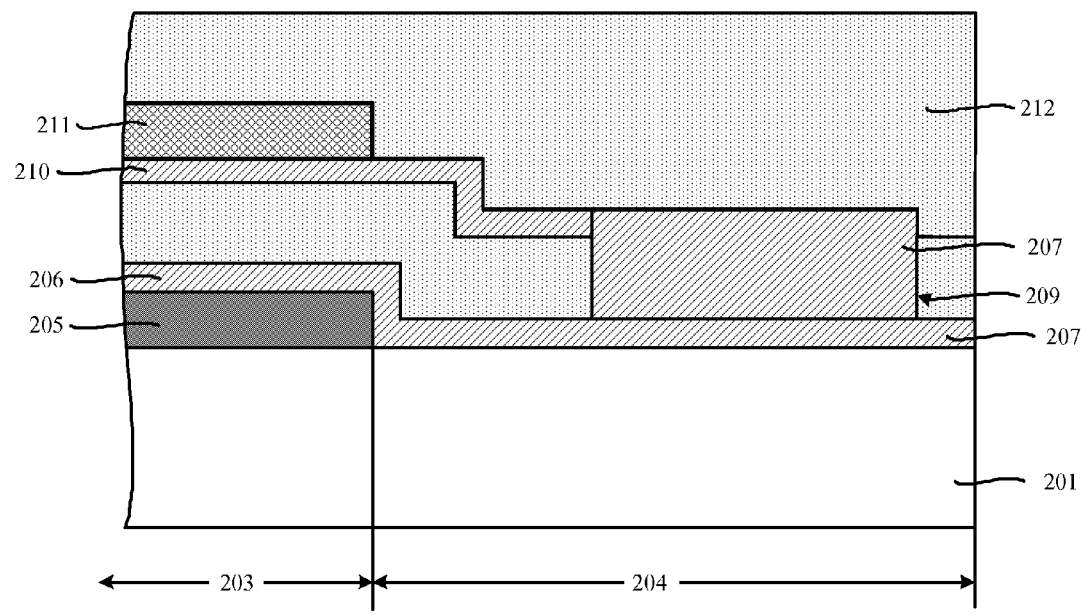

Subsequently, as shown in FIG. 8, a second organic film layer 212 is formed on the color filter layer 211, and covers the entire second metal layer 210. Both the second organic film layer 212 and the first organic film layer 208 are made of acrylic copolymer resin. Typically, the thickness of the first organic film layer 208 ranges from 1.5 μm to 2.5 μm, and the thickness of the second organic film layer 212 ranges from 1.5 μm to 2.5 μm.

Figure 9:
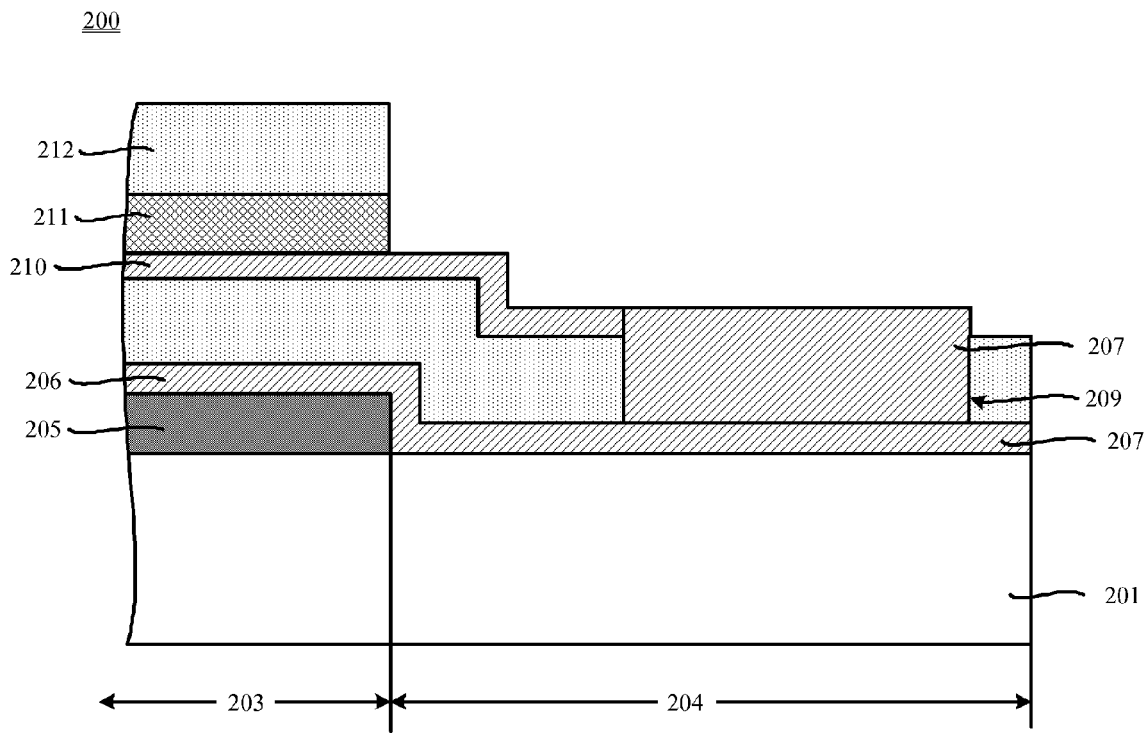

Subsequently, as shown in FIG. 9, a part of the second organic film layer 212 is etched off to uncover the conductive pad 207. In order to uncover the conductive pad 207 sufficiently, the second organic film layer 212 located in the non-display area 204 may be completely etched off, to completely uncover the second metal layer 210 located in the entire non-display area 204. FIG. 9 shows the case where the second organic film layer 212 located in the non-display area 204 is completely etched off. To this end, an in-cell touch color filter 200 is formed.

Accordingly, the present invention also provides a sealant applying method, which includes as follows.

Figure 10:
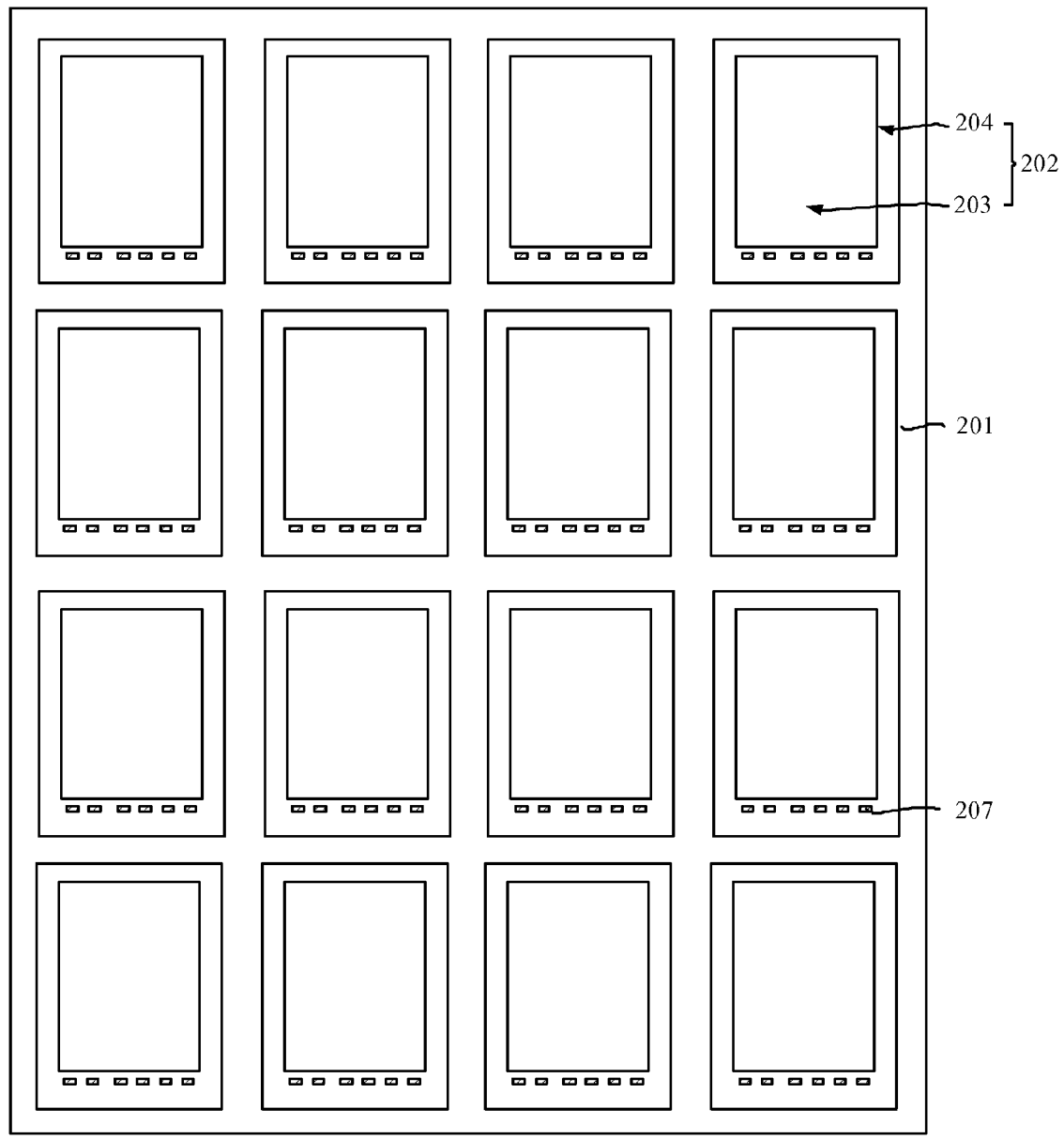
FIG. 10 is a top view of the in-cell touch color filter substrate according to an embodiment of the present invention.

Firstly, as shown in FIG. 10, the in-cell touch color filter substrate 200 is provided. The in-cell touch color filter substrate 200 includes a substrate 201, on which at least one row of display units 202 and at least one column of display units 202 are provided, each of the display units 202 includes a display area 203 and a plurality of non-display areas 204 surrounding the display area 203, and a plurality of conductive pads 207 are distributed in each of the non-display areas 204.

Figure 11:
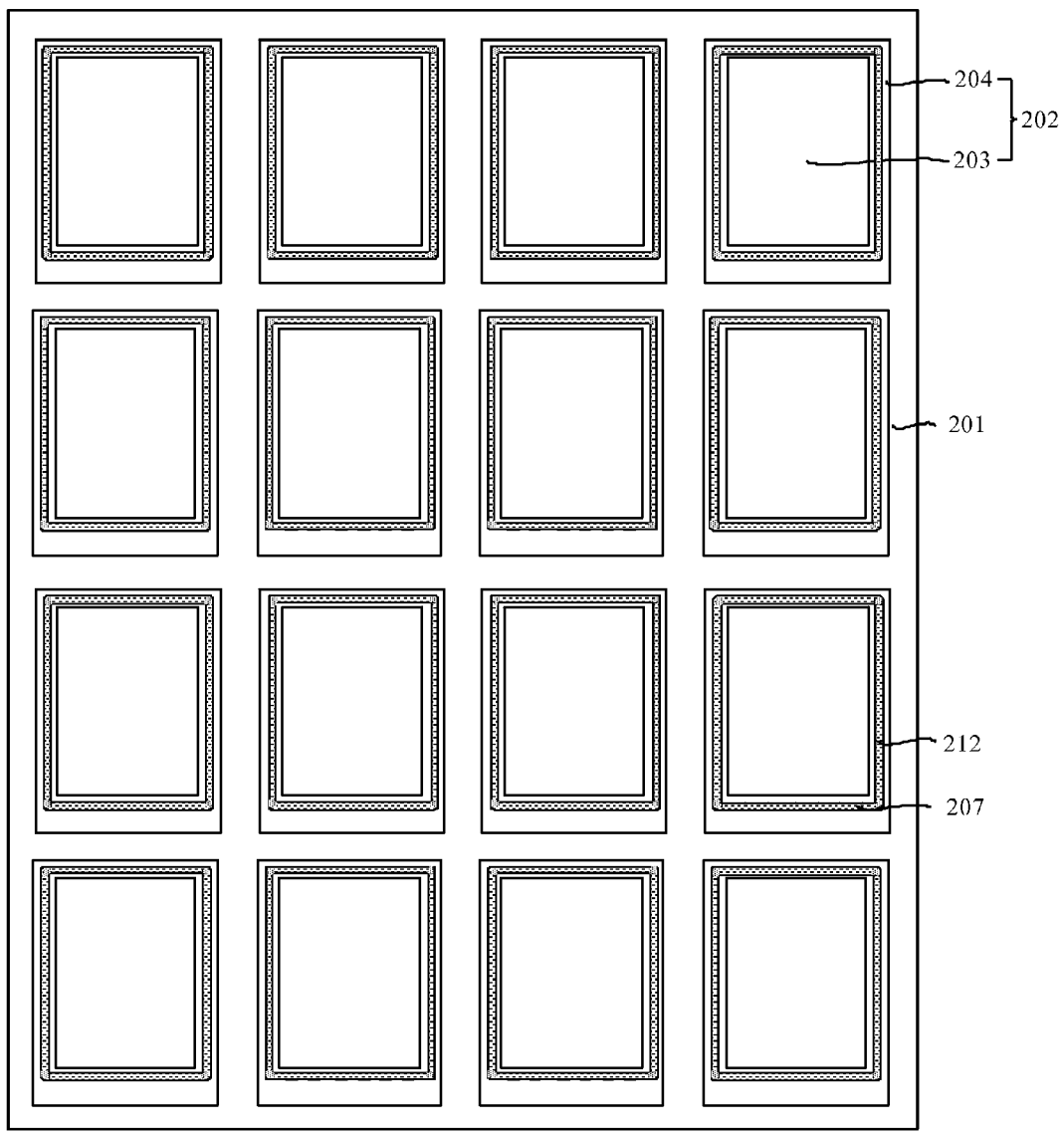
FIG. 11 is a top view of the in-cell touch color filter substrate after the applying of a sealant according to an embodiment of the present invention.

Subsequently, as shown in FIG. 11, a sealant 213 mixed with conductive gold ball bonds and fillers is applied in each of the non-display areas 204, with the sealant 213 completely covering the conductive pad 207. Preferably, the plurality of conductive pads 207 are located on the same side of the non-display area 204 and arranged linearly. Thus, during the applying of the sealant 213, the sealant 213 may be applied along a corresponding linear path, so that the time for the applying may be reduced, because no change or turn exists in the path of applying the sealant 213. More preferably, a plurality of conductive pads within each row or column of display units 202 may also be located on the same side of the non-display areas 204 of the row or column of display units 202 and arranged linearly, so that the path of applying the sealant 213 is linear within the area of the entire substrate 201, to avoid unnecessary halts and turns during the applying, to further reduce the time for the applying.

More importantly, precision requirements for applying the sealant are reduced so that it is unnecessary to make use of an applying method with a low speed to achieve a high applying precision, because no significant level difference exists in the path of applying the sealant 213. Meanwhile, because of the absence of the significant level difference, gold ball bonds having a particle diameter comparative to that of fillers may be chosen and mixed with the sealant 213. That is, both fillers and gold ball bonds which have comparative particle diameters may be mixed with the sealant 213, so that the functions of sealing and conducting can be implemented by applying the sealant once. That is, during the applying of the sealant on the in-cell touch color filter substrate 200, all tasks to be achieved in applying the sealant may be completed by applying the sealant 213 mixed with the gold ball bonds and fillers once. Additionally, because of the reduced applying precision requirements, it is possible to adopt a fast applying method. Compared with the prior art, the present invention not only reduces the number of applying the sealant but also improves the applying speed, thus the time for applying the sealant can be shortened effectively to promote the production efficiency significantly.

Figure 12:
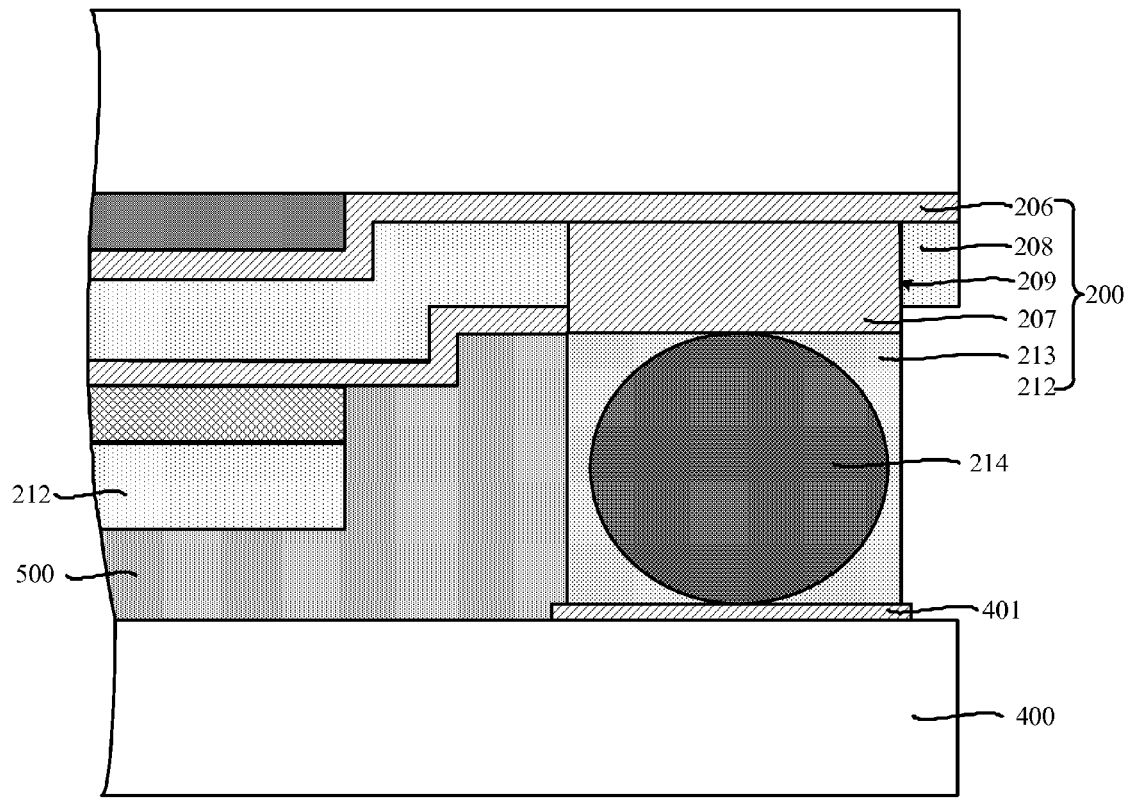
FIG. 12 is a schematic structural view of an in-cell touch panel according to an embodiment of the present invention.

Accordingly, as shown in FIG. 12, the present invention also provides an in-cell touch panel 300 which includes an in-cell touch color filter substrate 200, an array substrate 400 and a liquid crystal layer 500 disposed between the in-cell touch color filter substrate 200 and the array substrate 400. The in-cell touch color filter substrate 200 is adhered to the array substrate 400 through a sealant 213. A lower conductive pad 401 is provided on the array substrate 400, and a gold ball bond 214 in the sealant 213 directly contacts both the lower conductive pad 401 a conductive pad 207 to realize the electrical conduction between the conductive pad 401 and the conductive pad 207. Since no level difference exists in the area coated with the sealant 213, the gold ball bond 214 may be maintained in contact with the conductive pad 207 even if the position of the gold ball bond 214 is somewhat deviated, thus reducing the applying precision requirements for the sealant 213.

As can be seen, in the in-cell touch color filter substrate provided in the present invention, the through hole or through slot is provided in the first organic film at a place corresponding to the conductive pad, the second organic film at a place corresponding to the conductive pad is removed, and the first metal layer and the second metal layer are connected together through the through holes or through slots. Therefore, in the area of the conductive pad, the first metal layer and the second metal layer are arranged one above the other and uncovered by the second organic film layer. When the sealant mixed with gold ball bonds is applied on the area of the conductive pad, the gold ball bonds contact the second metal layer directly. That is, no level difference exists in the area coated with the sealant, therefore, all tasks to be achieved in applying the sealant may be completed by applying the sealant mixed with the gold ball bonds and fillers once. Additionally, because of the reduced applying precision requirements, it is possible to adopt a fast applying method. Compared with the prior art, the present invention not only reduces the number of applying the sealant but also improves the applying speed, thus the time for applying the sealant can be shortened effectively to promote the production efficiency significantly.

Obviously, various changes and variations can be made to the present invention by those skilled in this art without departing from the spirit and scope of the present invention. Thus, the present invention is intended to cover those changes and variations that fall into the scope of the claims of the present invention and their equivalents.

What is claimed is:

1. An in-cell touch color filter substrate, comprising:
   a substrate comprising a plurality of display areas and a plurality of non-display areas, wherein each non-display area surrounds one of the display areas; and
   a first metal layer, a first organic film layer, a second metal layer comprising a plurality of conductive pads provided in the non-display areas, and a second organic film layer, successively formed on the substrate,
   wherein a plurality of through holes or through slots are formed on the first organic film layer in the non-display areas, wherein the conductive pads electrically connect with the first metal layer via the through holes or through slots, and wherein the conductive pads are exposed through the second organic film layer.

2. The in-cell touch color filter substrate of claim 1, wherein the second metal layer in the non-display areas is completely uncovered by the second organic film layer.

3. The in-cell touch color filter substrate of claim 1, wherein the plurality of conductive pads in each of the non-display areas are all located on the same side of the non-display area and are arranged linearly.

4. The in-cell touch color filter substrate of claim 3, wherein the substrate comprises at least one row and at least one column of display areas.

5. The in-cell touch color filter substrate of claim 4, wherein the plurality of conductive pads in each row or column of display areas are all located on the same side of the non-display area for the row or column of display areas and are arranged linearly.

6. The in-cell touch color filter substrate of claim 1, wherein the thicknesses of the first organic film layer and the thickness of the second organic film layer are between 1.5 μm and 2.5 μm.

7. An in-cell touch panel comprising:
   an in-cell color filter substrate, comprising:
     a substrate comprising a plurality of display areas and a plurality of non-display areas, wherein each non-display area surrounds one of the display areas, and
     a first metal layer, a first organic film layer, a second metal layer comprising a plurality of conductive pads provided in the non-display areas, and a second organic film layer, successively formed on the substrate,
     wherein a plurality of through holes or through slots are formed on the first organic film layer in the non-display areas, wherein the conductive pads electrically connect with the first metal layer via the through holes or through slots, and wherein the conductive pads are exposed through the second organic film layer;
   an array substrate, and
   a liquid crystal layer disposed between the in-cell touch color filter substrate and the array substrate.

8. A method of manufacturing an in-cell touch color filter substrate, the method comprising:
   providing a substrate comprising at least one display area and at least one non-display area surrounding the at least one display area;
   forming a first metal layer on the substrate;
   forming a first organic film layer on the first metal layer;
   etching off a part of the first organic film layer to form at least one through hole or one through slot;
   forming, on the first organic film layer, a second metal layer comprising at least one conductive pad in the non-display area and electrically connected with the first metal layer through the through hole or through slot;
   forming a second organic film layer on the second metal layer; and
   etching off a part of the second organic film layer to uncover the conductive pad.

9. The method for manufacturing the in-cell touch color filter substrate of claim 8, wherein each non-display area is uncovered after a part of the second organic film layer is etched off.

10. The method for manufacturing the in-cell touch color filter substrate of claim 8, wherein the plurality of conductive pads in each of the non-display area are located on the same side of the non-display area and arranged linearly.

11. The method for manufacturing the in-cell touch color filter substrate of claim 10, wherein the substrate comprises at least one row and at least one column of display areas, wherein each of the non-display areas surround one of the display areas.

12. The method for manufacturing the in-cell touch color filter substrate of claim 11, wherein the plurality of conductive pads in each row or column of display areas are located on the same side of the non-display area for the row or column of display areas and are arranged linearly.

13. The method for manufacturing the in-cell touch color filter substrate of claim 8, wherein the thicknesses of the first organic film layer and the thickness of the second organic film layer are between 1.5 µm and 2.5 µm.

* * * * *